US005577638A

United States Patent [19]

Takagawa

[11] Patent Number: 5,577,638

[45] Date of Patent: Nov. 26, 1996

[54] BOTTOM POURING POT

[76] Inventor: Nobuyuki Takagawa, 5-12-20, Sagisu, Fukushima-ku, Osaka, Japan

[21] Appl. No.: 391,917

[22] Filed: Feb. 21, 1995

[51] Int. Cl.[6] .......................... A47J 31/00; B65D 37/00; B65D 5/06

[52] U.S. Cl. ...................... 222/185.1; 99/275; 99/323.3; 222/67; 222/105

[58] Field of Search .................................. 99/275, 323.3, 99/485, 494; 222/185.1, 67, 105, 146.6, 545, 107, 181

[56] References Cited

U.S. PATENT DOCUMENTS

| | | | |
|---|---|---|---|
| 3,843,021 | 10/1974 | Schieser | 222/105 |
| 3,848,776 | 11/1974 | Schieser | 222/181 |
| 4,113,147 | 9/1978 | Frazier et al. | 222/131 |
| 4,205,598 | 6/1980 | Leuschner et al. | 99/307 |
| 4,843,955 | 7/1989 | Henn et al. | 99/295 |
| 4,877,521 | 10/1989 | Petrucci et al. | 99/275 |
| 4,923,091 | 5/1990 | Sutera | 222/185.1 |
| 5,118,009 | 6/1992 | Novitsky | 222/183 |
| 5,121,778 | 6/1992 | Baker et al. | 222/185.1 |
| 5,323,832 | 6/1994 | Burrows | 222/185.1 |
| 5,325,996 | 7/1994 | Bannigan | 99/323.3 |
| 5,443,186 | 8/1995 | Grill | 222/105 |

*Primary Examiner*—Timothy F. Simone
*Attorney, Agent, or Firm*—Moonray Kojima

[57] ABSTRACT

A bottom pouring pot comprising a cartridge for accommodating liquid, and a separate mounting base for detachably mounting the cartridge thereto, wherein an inner container having an opening at a lower end thereof is placed in the cartridge, the opening being closed with a detachable plug body, a discharge port for discharging the liquid being formed in the plug body and is closed with first opening means for opening the discharge port when the cartridge is mounted on the base, and a flow passage is formed in the base which communicates with the discharge port when the cartridge is mounted on the base so as to enable the liquid to be poured out, whereby a bottom pouring pot is formed having an insulated inner container with only one opening and which has excellent handling characteristics and can be readily manufacted at a reduced cost.

4 Claims, 6 Drawing Sheets

BOTTOM POURING POT

BACKGROUND OF THE INVENTION

1. Field of Invention

This invention relates to insulated liquid containers, and more particularly, to such containers called "hot pots" or "cold pots" and the like.

2. Description of the Prior Art

The conventional pots include, aside from the type which involves pouring out the liquid by tilting the pot main body, the air pot for making use of air pressure, and the bottom pouring pot for making use of the weight of the liquid. In the air pot, there is an inner container having an opening at the upper end, and a pump for feeding air must be provided in order to pour out the liquid.

By contrast, in the bottom pouring pot, an opening is formed at the upper end, and an inner container having a discharge port is provided at the lower end. In this structure, the pump indispensable in the air pump is not needed, and the effort for pouring out (the pump provides the pushing force) is decreased, and the operating position is lower, so that it is easy to pour out the liquid from at an elevated position such as on the table.

It is, however, difficult to manufacture the inner container of such prior pots having an insulating capacity opened at both the upper and lower ends, and hence the cost is higher.

SUMMARY OF THE INVENTION

It is hence a primary object to provide a bottom pouring pot wherein liquid is fed into and poured out of one opening formed at lower end of an inner container, thereby obtaining a bottom pouring pot without using an inner container having openings at both upper and lower ends. Thus the effort necessary for pouring is reduced, pouring operation on the table or other elevated place is facilitated, and the cost is reduced. The cartridge is mounted on a based to form one body. A first opening means which is usually closed is provided at a discharge port of the cartridge, so that the cartridge alone may be left after being filled with hot water or hot beverage. For example the mounting base may be installed at a specific place, and the cartridge may be carried to another location after filling with liquid. Thus, the weight and size are reduced for the mounting base and it is easier to handle the cartridge alone rather than carrying the entire pot.

It is other object of the invention to provide a bottom pouring pot capable of pouring the liquid quietly and smoothly, wherein necessary air may flow in through a ventilation path, vent and pipe when pouring the liquid.

It is another object of the invention to provide a bottom pouring pot capable of holding the cartridge securely by forming fixing means between the cartridge and the mounting base, and preventing the cartridge from being mis-mounted on the base.

It is a different object of the invention to provide a bottom pouring pot capable of preventing leak of the liquid by securely connecting the discharge port to be connected and the flow path, and vent and ventilation path, by using a fixing clamp to attach the cartridge and mounting base.

Other objects of the invention will be better appreciated from the following detailed description of embodiments.

DETAILED DESCRIPTION OF THE DRAWINGS

Figure 1:
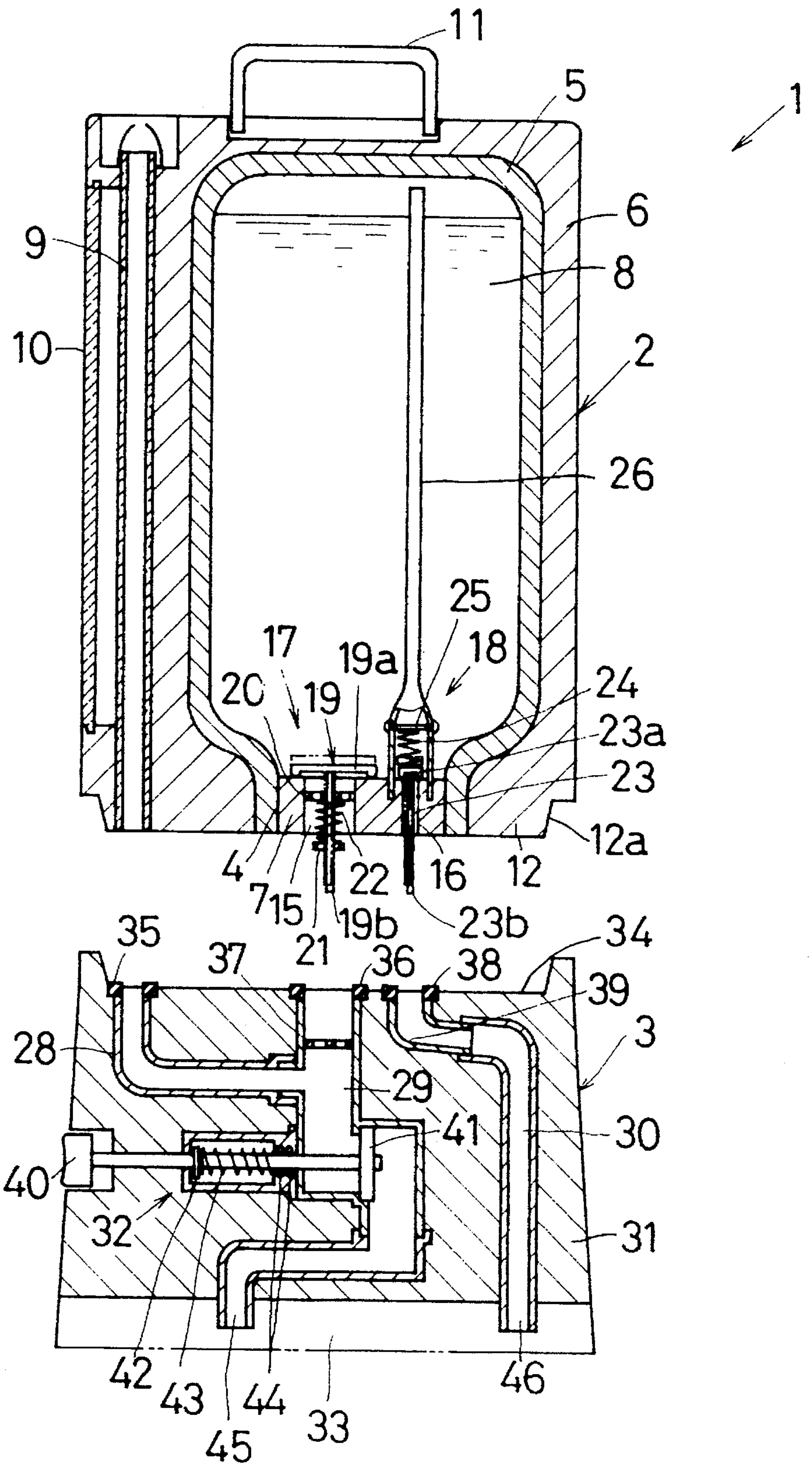
Figure 2:
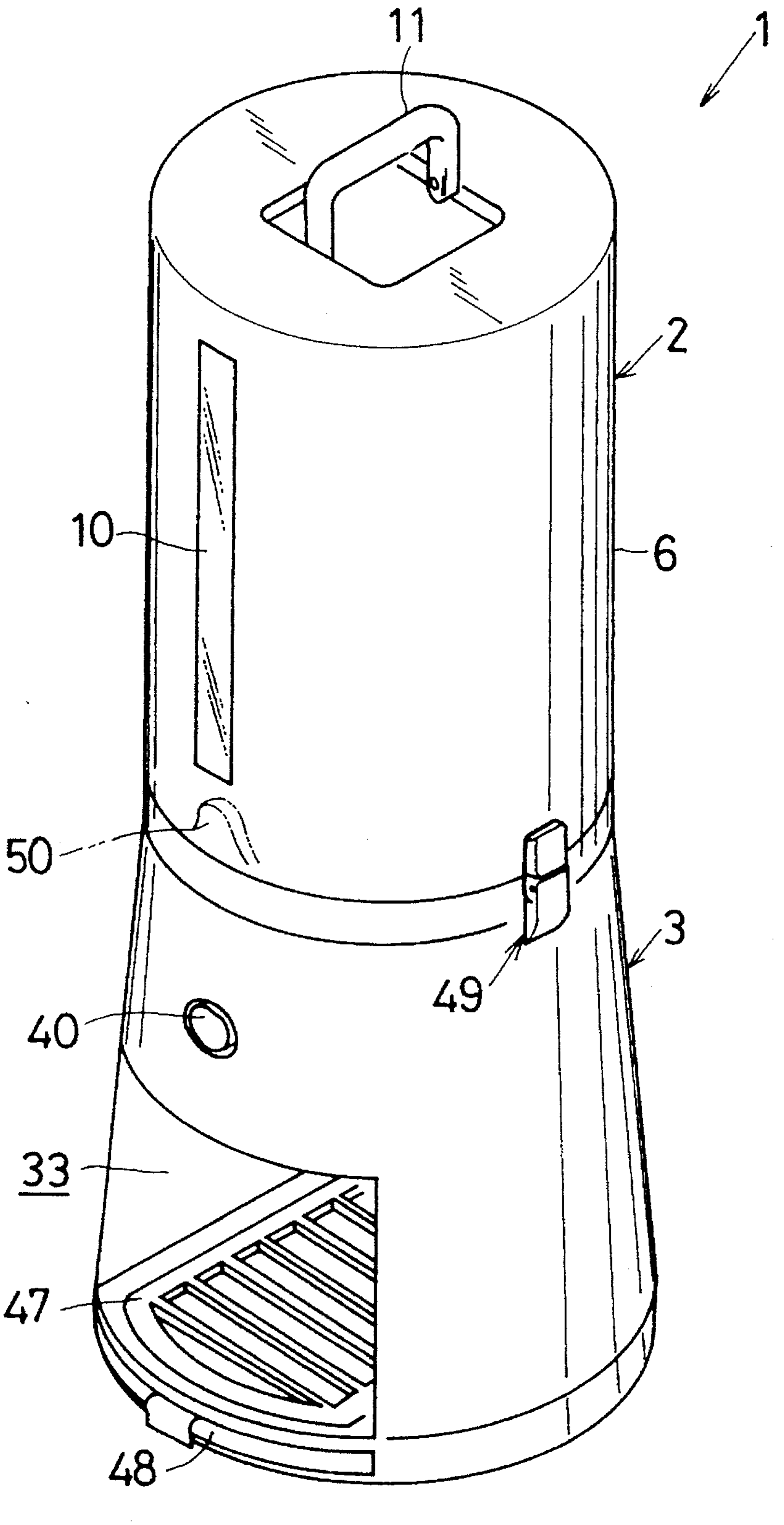
Figure 3:
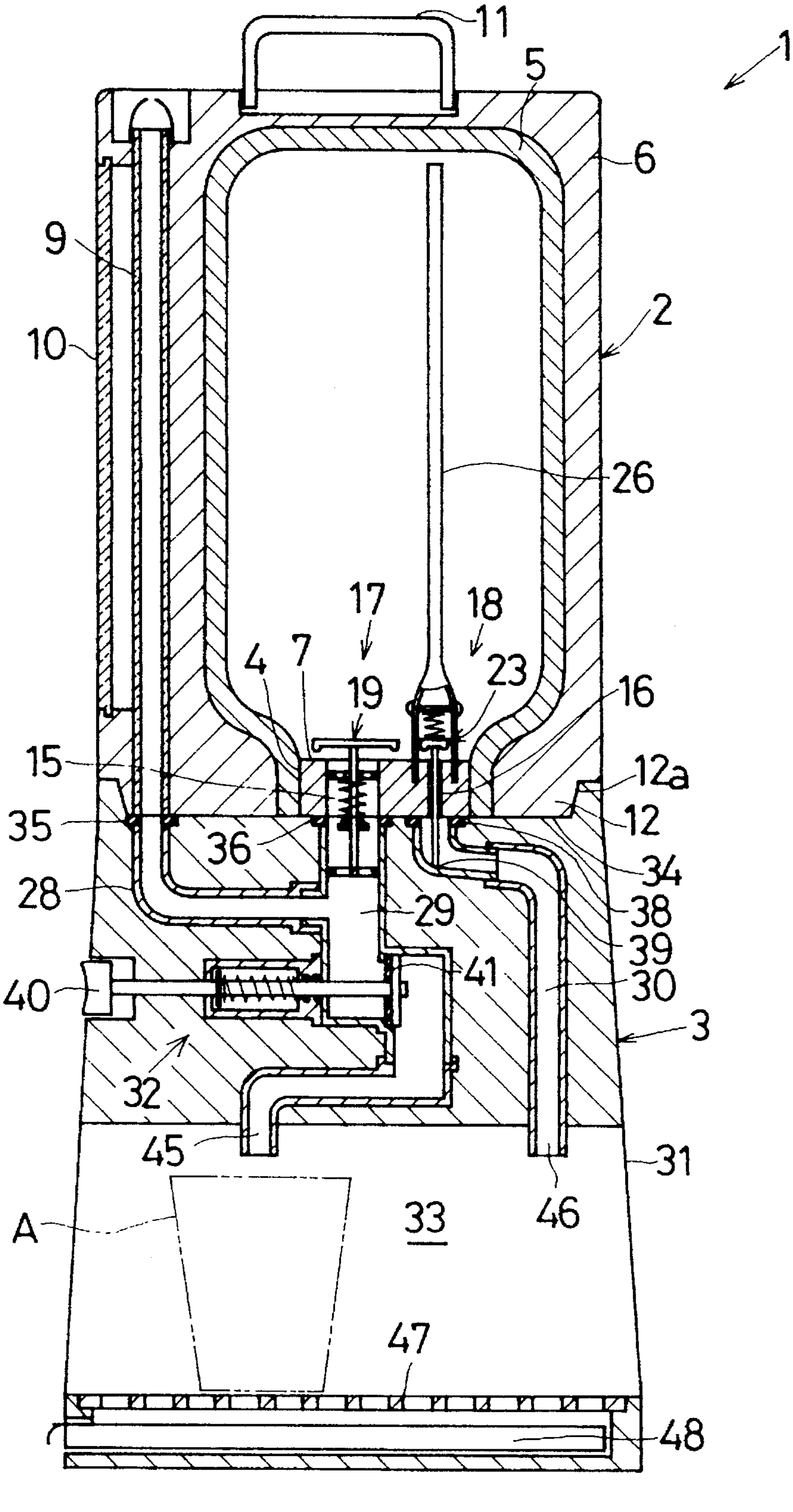
Figure 4:
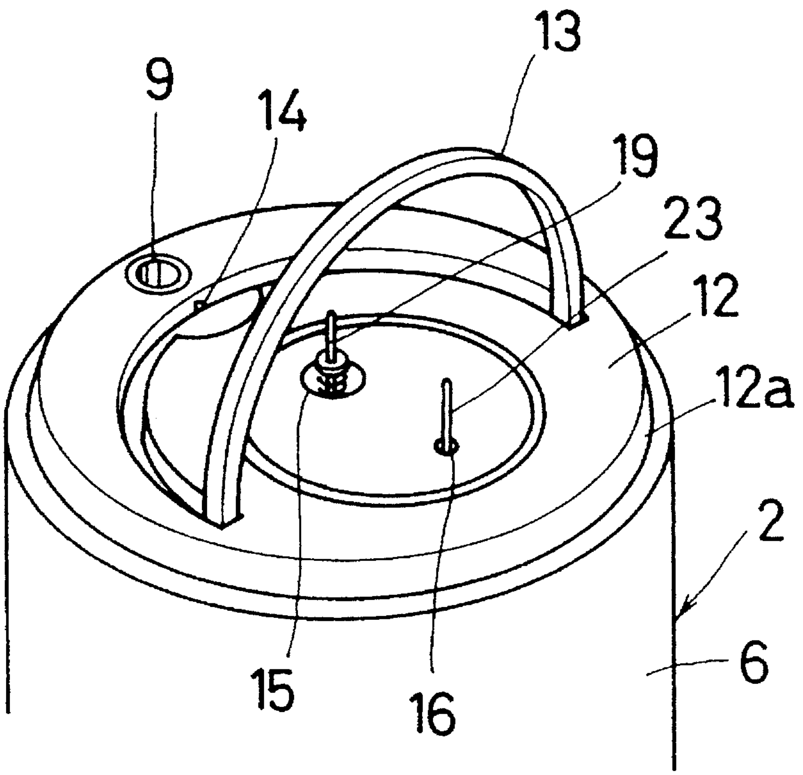
Figure 5:
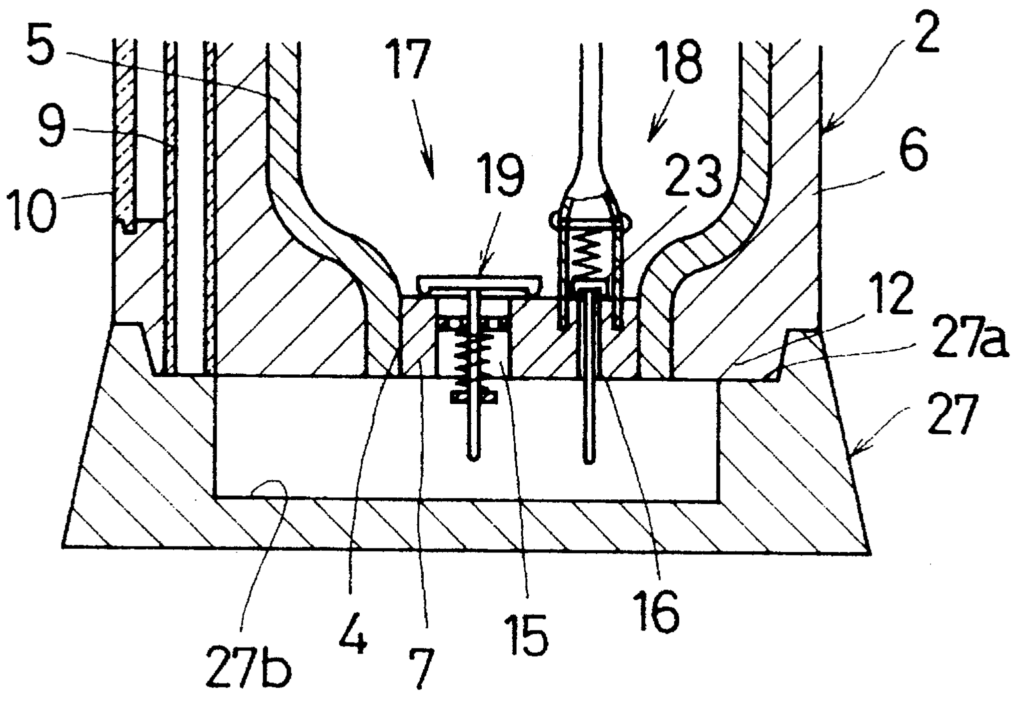
Figure 6:
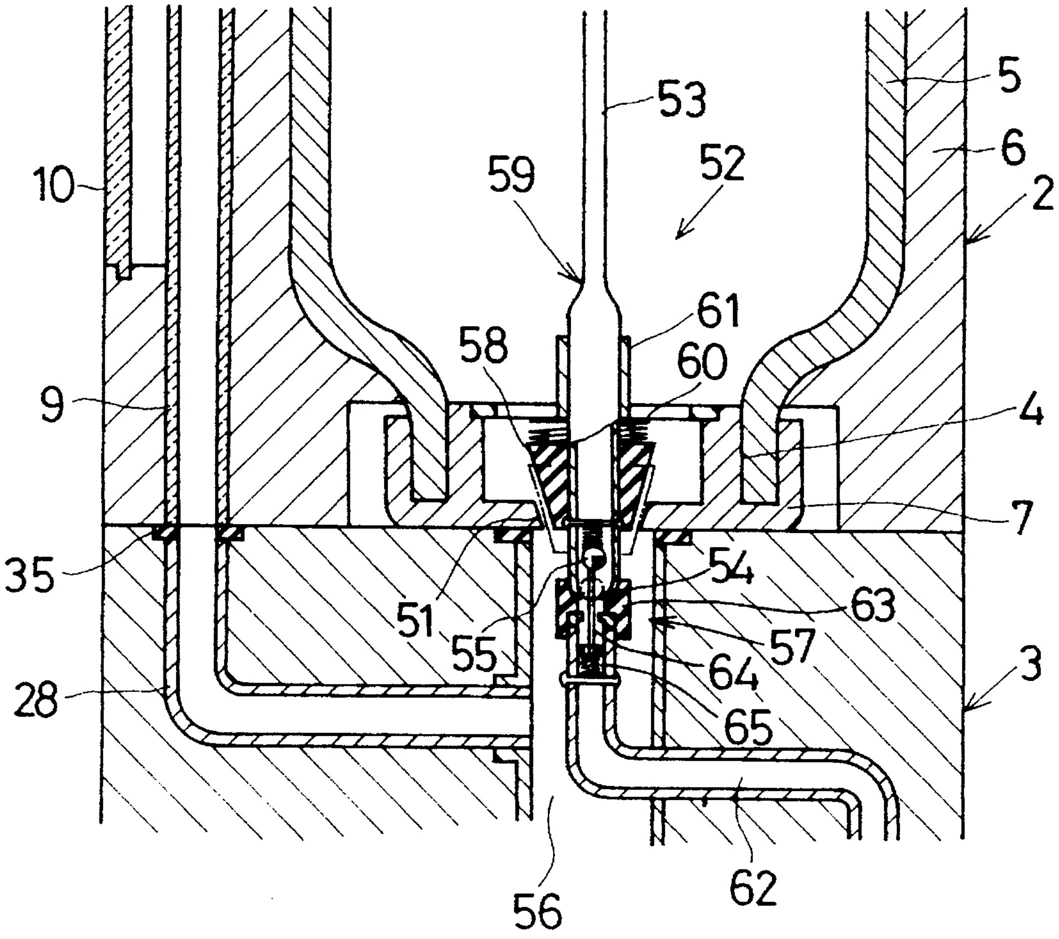

The drawings show embodiments of the invention, in which:

FIG. 1 is an exploded sectional view of essential parts of a bottom pouring pot, FIG. 2 is an outline perspective view of the bottom pouring pot, FIG. 3 is a general longitudinal sectional view of the bottom pouring pot, FIG. 4 is a perspective view showing other example of the bottom of the cartridge, FIG. 5 is a sectional view showing the state of supporting the cartridge on a support base, and FIG. 6 is a sectional view of essential parts showing a different embodiment of a bottom pouring pot of the invention.

EMBODIMENTS

Description of the preferred embodiments of the invention are described below.

FIGS. 1 and 2 show is a perspective view showing the appearance a bottom pouring pot 1 (hereinafter called pot) comprising a cartridge 2 for accommodating the liquid, and a mounting base 3 for detachably mounting the cartridge 2 on. The liquid is poured out from the mounting base 3 in lower position by its own gravity.

The cartridge 2 has an insulated inner container 5 provided with an opening 4 at the lower end incorporated in a casing 6 as shown in FIG. 1 and FIG. 3, and the opening 4 of this inner container 5 is closed with a detachable plug body 7 so that the liquid 8 can be contained. The lower end face of the plug body 7 is flush with the lower face of the casing 6.

In an outer peripheral side position of the inner container 5 of the casing 6, an indicator pipe 9 made of a transparent pipe is provided in the vertical direction from the lower end face. In an outer peripheral position of the indicator 9, a see-through window 10 is provided for seeing through the indicator pipe 9. This is for monitoring the level of the liquid.

On the upper end face of the casing 6, a handle 11 is provided for the convenience of carrying the cartridge 2. This handle 11 is tiltable, and when tilted, it does not project from the top surface of the casing 6. This is desired because it is necessary to turn the cartridge 2 upside down when filling the inner container 5 with the liquid 8.

At the lower end of the casing 6, as shown in FIG. 1 and FIG. 3, a fitting bulge 12 having a taper **12*a* is formed for mounting on the mounting base 3** easily and correctly.

Besides, as shown in FIG. 4, when a tiltable handle 13 is provided so as to be in closed state also at the lower end face of the casing 6, it is possible to carry whether the cartridge 2 is turned upside down or not, and it is easier to handle when it is empty of the liquid 8. Reference numeral 14 in FIG. 4 is a positioning protrusion for holding the handle in the closed state. A similar positioning protrusion may be formed in the attaching part of the handle 11.

The liquid 8 contained in the inner container 5 may be poured out when the cartridge 2 is mounted on the mounting base 3, and the plug body 7 is arranged as described below for this purpose.

That is, in the plug body 7, a discharge port 15 and a vent 16 penetrating in the vertical direction are formed. They are provided with opening means 17, 18 for thrusting them in the stopping (i.e. vertical in the drawing) direction to close them.

The first opening means 17 as the opening means are provided in the discharge port 15 and comprises a valve member 19 (shown in T shape from a side view in drawing) comprising a plate 19*a* larger than the diameter of the discharge port 15, and a bar 19*b* of a specific length set up vertically from the middle thereof. A holding frame 20 as means for thrusting it, is provided on the inner circumference of the discharge port 15, for slidably holding the bar 19*b* of the valve member 19. The discharge port 15 may be relatively large for thrusting the valve member 19. A stopper 21 is fitted to the lower end side of the bar 19*b* of the valve member 19, and a coil spring 22 is disposed therebetween. The valve member 19 stops the discharge port 15 from the inner side of the plug body 7.

The second opening means 18 as the opening means are provided in the vent 16 and comprises a valve member 23 (shown in T shape from a side view in drawing) comprising a plate 23*a* larger than the diameter of the vent 16, and a bar 23*b* of a specific length set up vertically from the middle thereof, and thrusting means for thrusting it. For thrusting the valve member 23, however, since the diameter of the vent 16 may be small, means are provided composing a coil spring 24 for pressing the plate 23*a* of the valve member 23 from above, and a stopper 25 for holding the upper end of the coil spring 24.

For fitting the coil spring 24 and stopper 25, a pipe 26 standing in the vent 16 of the plug body 7 is utilized. This pipe 26 is of a length reaching the upper end of the inner container 5, and permits the liquid 8 to be poured out smoothly. The pipe 26 is preferred to be small in diameter in order to decrease leak of the liquid 8 when the cartridge 2 is put on the mounting base 3. Hence, its upper portion is formed of smaller diameter than the coil spring 24 and stopper 25.

In the cartridge 2, meanwhile, since the bars 19*b*, 23*b* of the valve members 19, 23 project from the lower ends, when turned upside down, it touches down, but otherwise it does not touch down. Hence, an exclusive support base 27 may be provided as shown in FIG. 5. This support base 27 has a fitting recess 27*a* corresponding to the fitting bulge 12 at the lower end of the cartridge 2 provided at the upper end, and forms a recess 27*b* in a suitable depth for allowing drop of the bars 19*b*, 23*b* of the valve members 19, 23 in the middle.

The mounting base 3 forms, as shown in FIG. 1, a communicating pipe 28 for communicating with the indicator pipe 9 when mounting the cartridge 2, a flow path 29 for communicating with the discharge port 15, and a ventilation path 30 communicating with the vent 16, all in a casing 31. A valve 32 for controlling pouring of the liquid 8 is formed in the flow path 29, and a pouring space 33 is formed in the lower part.

Furthermore, at the upper end of the casing 31, a fitting recess 34 corresponding to the fitting bulge 12 of the cartridge 2 is formed.

The communicating pipe 28 has its upper end opened at a position corresponding to the lower end of the indicator pipe 9 when mounting the cartridge 2, and a ring-shaped packing 35 is fitted in this opening. The other end of the communicating pipe 28 is connected to the upper part of the flow path 29.

The flow path 29 has its upper end opened at a position corresponding to the discharge port 15 when mounting the cartridge 2, and a packing 36 is provided in this opening. Near the opening, there is a frame member 37 as push-up means for pushing up the valve member 19 of the first opening means 17 when the cartridge 2 is mounted by resisting its thrusting force to open the discharge port 15. The frame member 37 may be formed in a cross, for example, as seen from the plane, and when the lower end of the bar 19*b* of the valve member 19 abuts against the middle of the frame member 37, the valve member 19 is pushed up.

Similarly, at the position corresponding to the vent 16, the upper end of the ventilation path 30 is opened, and a packing 38 is also provided in this opening. In the ventilation path 30, meanwhile, in order to push up the valve member 23, an abutting part 39 is formed as push-up means, being deflected in the lateral direction at a specified position. When the lower end of the bar 23*b* of the valve member 23 touches the abutting part 39, the valve member 23 is pushed up by resisting the thrusting force.

The specified length of the valve members 19, 23 is set depending on the position of the frame member 37 and abutting part 39.

Aside from the above structure, for example, the first opening means 17 and second opening means 18 may comprise check valves (not shown) fitted to the inner side of the plug body 7, and the push-up means may comprise a bar (not shown) projecting upward of the flow path 29 or ventilation path 30. In this case, a particular thrusting means is not necessary.

The casing 31 may be packed with an insulator (not shown) or incorporate a heater (not shown) so as to insulate or heat the liquid 8 in the communicating pipe 28 or flow path 29.

The packings 35, 36, 38 are formed so as to project from the upper end face of the casing 31 for composing the mounting base 3 in normal state as shown in FIG. 1. This is intended to push up the valve members 19, 23 after forming an airtight seal by contact of the packings 35, 36, 38 with the corresponding positions. As a result, fluid leak from the connection parts is completely eliminated.

When valve 32 in the flow path 29 is a pushbutton type, for example, as shown in the drawing, there is no projecting portion and the disadvangtages produced by such projections are eliminated. At the front end of a pushbutton 40, a valve body 41 is fitted, and this valve body 41 is constituted by thrusting in a direction of cutting off of the flow path 20 with stopper 42 and spring coil 43. Reference numerals 44, 44 in the drawing are seals.

A pour port 45 at the lower end of the flow path 29 leads out to the pouring position of the pouring space 33, and releases an opening 46 at the lower end of the ventilation path 30 into the atmosphere in the hind position of the pouring space 33.

The pouring space 33 has a height for placing a cup A or the like, and a detachable grating 47 is provided beneath, and an insertable tray 48 is accommodated beneath the grating 47. When the cartridge 2 is put on the mounting base 3, the liquid 8 existing in the pipe 26 is discharged and recovered on the tray 48 through the ventilation path 30.

The cartridge 2 and mounting base 3 are fixed by various fixing means such as fitting protrusion 12 and fitting recess 34, compression bond, and detention. In this embodiment, as shown in FIG. 2, they are coupled by plural fixing clamps 49. By fixing with such fixing clamps 49, the position of the cartridge 2 may be set correctly, and the discharge port 15 to be connected and the flow path 29, and the vent 16 and ventilation path 39 can be completely connected to prevent leak of the liquid 8. To eliminate misplacement of the cartridge 2 in bare 3, for example, as indicated by virtual line in FIG. 2, a bulge 50 may be formed in the fitting parts of the cartridge 2 and mounting base 3 so as to allow fitting only in a specific direction.

In using the fixing clamps 49, the mounting direction of the cartridge 2 on the mounting base 3 is specified. Thus the direction is specified when setting the plug body 7 having the discharge port 15 and vent hole 16 differing in position in the opening 4 of the inner container 5. But, as shown in FIG. 6, for example, such necessity may be avoided by forming the first opening means 17 and second opening means 18 into one body and setting such body in the middle of the opening 4.

That is, a discharge port 51 is formed in the middle of the plug body 4 for detachably shutting the opening 4 at the lower end of the inner container 5, opening means 52 being thrust in the shutting direction to close the discharge port 51 is provided in the discharge port 51, the opening means 52 holds a pipe 53 of which upper end reaches the upper end portion of the inner container 5 and lower end projects downward from the discharge port 51, the pipe 53 holds a shutting member 55 for closing a vent 54 at the lower end of the pipe 53, being thrust in the shutting direction, a flow path 56 having its upper end opened in a position corresponding to the discharge port 51 is formed in the mounting base 3, push-up means 57 is formed for pushing up the opening means 52 and shutting member 55 by resisting the thrusting force when the cartridge 2 is mounted, and opening the discharge port 51 and vent 54, and the push-up means 57 is formed in a tubular form communicating with the vent 54, branched off from within the flow path 56, and opened to the atmosphere at the front end.

More specifically, for example, the opening means 52 comprises a valve member 59 formed by fitting a packing 58 of an inverted taper at the front end portion of the pipe 53, and thrusting means comprising a coil spring 60 and a holding frame 61 for thrusting it, and a ball is held as the shutting member 55 in the vent 54 at the lower end of the pipe 53.

The push-up means 57 is formed in a tubular form for forming a ventilation path 62, and a nearly cylindrical packing 63 is fitted to the upper end to as to keep the arrangement airtight with the vent 54 at the lower end of the pipe 53, and a bar 64 for pushing up the shutting means 55 is thrust upward and held above the push-up means 57. The bar 64 is thrust with a coil spring 65 in order to provide a time difference between pushing of the valve member 59 and pushing of the shutting means 55, so that the shutting means 55 may be pushed up after the push-up means 57 and the vent 54 at the lower end of the pipe 53 have communicated in an airtight state.

Detachable mounting of the plug body 7 on the inner container 5 may be done, for example, by screwing one into the other.

Using the same principle as above, moreover, the discharge port 51 and flow path 56 in FIG. 6, for example, are formed in the center of the cartridge 2 and mounting base 3, and a groove (not shown) is formed to draw a circle at a position corresponding to the lower end of the indicator pipe 9, on the outer circumference of the top surface of the mounting base 3, so that connection of the cartridge 2 and mounting base 3 may be also effected by screwing of one into the other.

In the embodiment, liquid 8 is supplied into the inner container 5. By turning the cartridge 2 upside down and removing the plug body 7, liquid is supplied through the opening 4. Then the plug body 7 is attached and the cartridge 2 is returned to the initial position. It is carried to the installing position on the mounting base 3, and is correctly put on the mounting base 3 by matching with the position of the fixing clamp 49. Instead of holding by hand, when carrying plural sets on a wagon or the like, the supporting base 27 as shown in FIG. 5 is very useful.

By thus mounting, the valve member 19 of the first opening means 17 of the cartridge 2 is pushed up by the presence of the frame member 37, and the valve member 23 of the second opening means 18, by the presence of the abutting member 39, and the inner container 5, discharge port 15, and flow path 39 communicate with each other, and so do the inner container 5, pipe 26, vent 16, and ventilation path 30. The liquid 8 existing in the pipe 26 before mounting the cartridge 2 is discharged into the tray 48 through the vent 16 and ventilation path 30 by its own gravity when the inner container 5, vent hole 16 and ventilation path 30 communicate with each other. Afterwards, by manipulating the pushbutton 40, the liquid 8 is poured out from the pour outlet 45 through the flow path 29. When pouring out the liquid 8, air can flow into the inner container 5 through the ventilation path 30, vent hole 16, and pipe 26, and the liquid passing through the discharge port 15 and flow path 29 can be poured out smoothly.

Therefore, the liquid 8 can be supplied and poured out through one opening 4 formed at the lower end of the inner container 5, and the bottom pouring pot 1 can be obtained without using an inner container having upper and lower openings. Hence the effort required for pouring can be reduced, and pouring operation on a table or elevated place is easy, while the cost is suppressed, which are outstanding effects.

Moreover, the cartridge 2 and mounting base 3 may be formed as one body when mounted and because of the normally closed first opening means 17 and second opening means 18 being provided at the discharge port 15 and vent 16 of the cartridge 2, the cartridge 2 may be also used alone, detached from the base, after being filled with, for example, hot water or other beverage.

Accordingly, for example, the mounting base 3 may be installed at a specific position, and the cartridge 2 alone may be brought to another place after being filled with liquid 8. Advantageously, the weight and size are reduced for the mounting base 3, and it is easier to handle than when carrying the entire pot 1.

Furthermore, when pouring out the liquid 8, a necessary volume of air flows in through the ventilation path 30, vent 16, and pipe 26, the liquid 8 flows out quietly and smoothly without pulsation.

In addition, the fixing clamp 49 is formed between the cartridge 2 and mounting base 3, and the mounting state of the cartridge 2 can be held securely, and the fixing clamp 49 is formed on the outer side, which is effective for preventing misplacement of of to cartridge 2 on base 3. Also, since the fixing clamp 49 connects the cartridge 2 and mounting base 3, the portions to be connected are joined securely, and it is effective for securely preventing leak of the liquid 8.

In the foregoing embodiments, the push-up means of the invention corresponds to the frame member 37 and abutting part 39 of the embodiments, and the front end of the ventilation path corresponds to the opening 46, but the invention is not limited to the constitution of the foregoing embodiments.

What is claimed is:

1. A bottom pouring pot comprising:

a cartridge for containing liquid, and a mounting base on which the cartridge is mounted detachably, wherein the cartridge incorporates an inner container having an opening at the lower end, the opening being stopped with a detachable plug body, a discharge port is formed in the plug body, and first opening means for closing the discharge port is provided at the discharge port, a flow path having an upper end opened at a position corresponding to the discharge port is formed in the mounting base, push-up means is formed for pushing up the first opening means by resisting its thrusting force to open the discharge port when the cartridge is mounted, a valve for controlling pouring of the liquid is formed in the flow path, and a pour outlet at the lower end of the flow path is led out to the pouring position.

2. A bottom pouring pot of claim 1, wherein a vent is formed in the plug body, second opening means for closing the vent, and a pipe reaching an upper end of the inner container are provided in the vent, a ventilation path having an upper end opened at a position corresponding to the vent is formed in the mounting base, push-up means is formed to push up the second opening means by resisting its thrusting force to open the vent when the cartridge is mounted, and the front end of the ventilation path is opened to the atmosphere.

3. A bottom pouring pot of claim 1, wherein fixing means for coupling both are formed at outer sides of the cartridge and mounting base.

4. A bottom pouring pot of claim 1, wherein fixing means for coupling both are formed at outer sides of the cartridge and mounting base, and the fixing means is composed of a fixing clamp for applying a mutually attracting force.

* * * * *